United States Patent [19]

Pringle

[11] Patent Number: 5,373,898

[45] Date of Patent: Dec. 20, 1994

[54] ROTARY PISTON WELL TOOL

[75] Inventor: Ronald E. Pringle, Houston, Tex.

[73] Assignee: Camco International Inc., Houston, Tex.

[21] Appl. No.: 142,733

[22] Filed: Oct. 25, 1993

Related U.S. Application Data

[63] Continuation-in-part of Ser. No. 963,864, Oct. 20, 1992, Pat. No. 5,316,094.

[51] Int. Cl.⁵ .................................... E21B 23/00
[52] U.S. Cl. ................................ 166/72; 166/104; 166/117.7
[58] Field of Search .................. 166/72, 104, 117.7

[56] References Cited

U.S. PATENT DOCUMENTS

| | | | |
|---|---|---|---|
| 3,405,771 | 10/1968 | Carr et al. | 175/73 |
| 4,286,676 | 9/1981 | Nguyen et al. | 175/74 |
| 4,448,254 | 5/1984 | Barrington | 166/373 |
| 4,862,958 | 9/1989 | Pringle | 166/72 |
| 5,133,404 | 7/1992 | Dollison | 166/72 |
| 5,156,223 | 10/1992 | Hipp | 175/296 |

Primary Examiner—Hoang C. Dang
Attorney, Agent, or Firm—Fulbright & Jaworski

[57] ABSTRACT

A well tool having an elongate circular body with an enclosed fluid bore extending longitudinally therethrough. A fixed plate extends radially between the bore and the body and a rotatable piston extends between the enclosed bore and the body and is rotatable about the enclosed bore. A hydraulic control line extends longitudinally to a position between the plate and the piston for rotating the piston. The tool may be an orientation tool and include a rotatable mandrel actuated by the piston. A recocking spring is provided recocking the piston and valve means are provided in the hydraulic line for admitting and venting fluid from the piston.

11 Claims, 7 Drawing Sheets

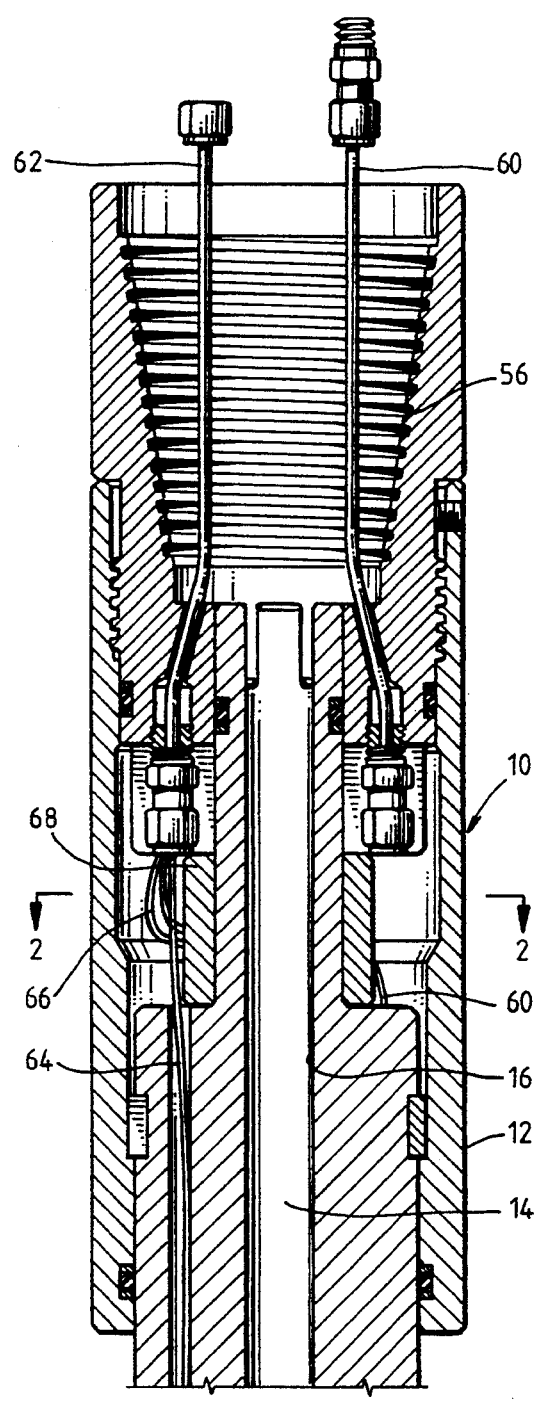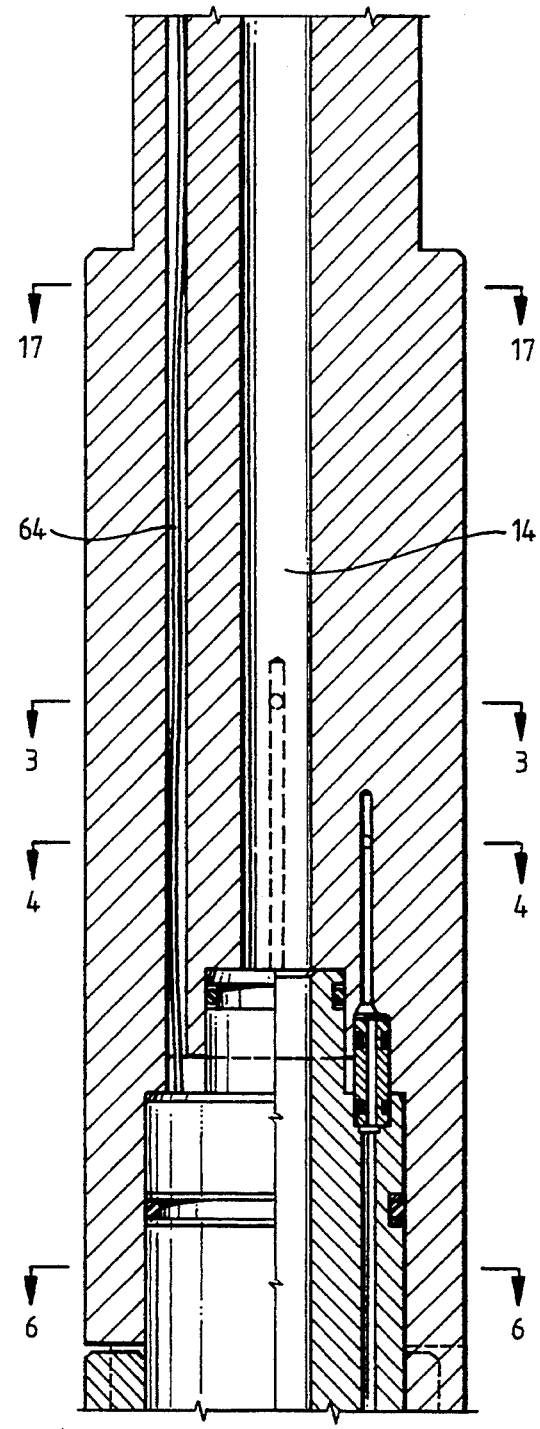
FIG.1A
FIG.1B

ROTARY PISTON WELL TOOL

CROSS-REFERENCE TO RELATED APPLICATION

This application is a continuation-in-part of patent application Ser. No. 07/963,864, filed Oct. 20, 1992, and entitled "Well Orienting Tool and/or Thruster", now U.S. Pat. No. 5,316,094, issued May 31, 1994.

BACKGROUND OF THE INVENTION

The present invention relates to a rotary piston well tool for operating other well components such as orientation tools, packers and sliding sleeves.

In use as an orienting tool, the present invention is particularly useful in a coiled tubing for orienting a bottom hole assembly which consists of a bent sub, a steering motor and a bit connected to the bottom of the coiled tubing.

SUMMARY

The present invention is directed to a rotary powered well tool having an elongate circular body in which the body has an enclosed fluid bore extending longitudinally through the body. A fixed plate extends radially between the enclosed bore and the body and a rotatable piston extends between the enclosed bore and the body and is rotatable about the enclosed bore. A hydraulic control line longitudinally extends in the body and extends to a position between the plate and the piston for actuating the piston.

Another feature of the present invention is the provision for means for recocking the piston. Preferably, the recocking means includes torsional spring means.

Another object of the present invention is the provision of valve means in the hydraulic control line for admitting fluid for actuating the piston and for venting fluid from the piston for easily recocking the piston.

Yet a still further object is the provision of means monitoring the rotational position of the piston for controlling its operation.

Still a further object of the present invention is the provision of a well orientation tool for rotationally orienting a well tool in a well bore and includes an elongate circular body in which the body has an enclosed fluid bore extending longitudinally through the body for conducting drilling fluids therethrough. A mandrel is rotatable in the body and extends out of the body for providing rotation to a well tool. A fixed plate extends radially between the enclosed bore and the bore and a rotatable piston extends between the enclosed bore and the body and is rotatable about the enclosed bore. The piston is connected to the mandrel whereby rotational movement of the piston rotates the mandrel. A hydraulic control line longitudinally extends in the body to a position between the plate and the piston for rotationally actuating the piston. The tool includes means for recocking the piston and preferably includes valve means for admitting and venting fluid from the hydraulic control line to and from the piston.

Yet a still further object of the present invention is wherein the orientation tool includes first ratchet means for allowing recocking of the piston, and second ratchet means for holding the rotational position of the mandrel when the piston is recocked.

Other and further objects and features and advantages will be apparent from the following description of a presently preferred embodiment of the invention, given for the purpose of disclosure, and taken in conjunction with the accompanying drawings.

BRIEF DESCRIPTION OF THE DRAWINGS

FIGS. 1A, 1B, 1C, 1D, 1E are continuations of each other and form an elevational view, partly in section, illustrating an orientation tool utilizing the present invention.

DESCRIPTION OF THE PREFERRED EMBODIMENT

Figure 1C:
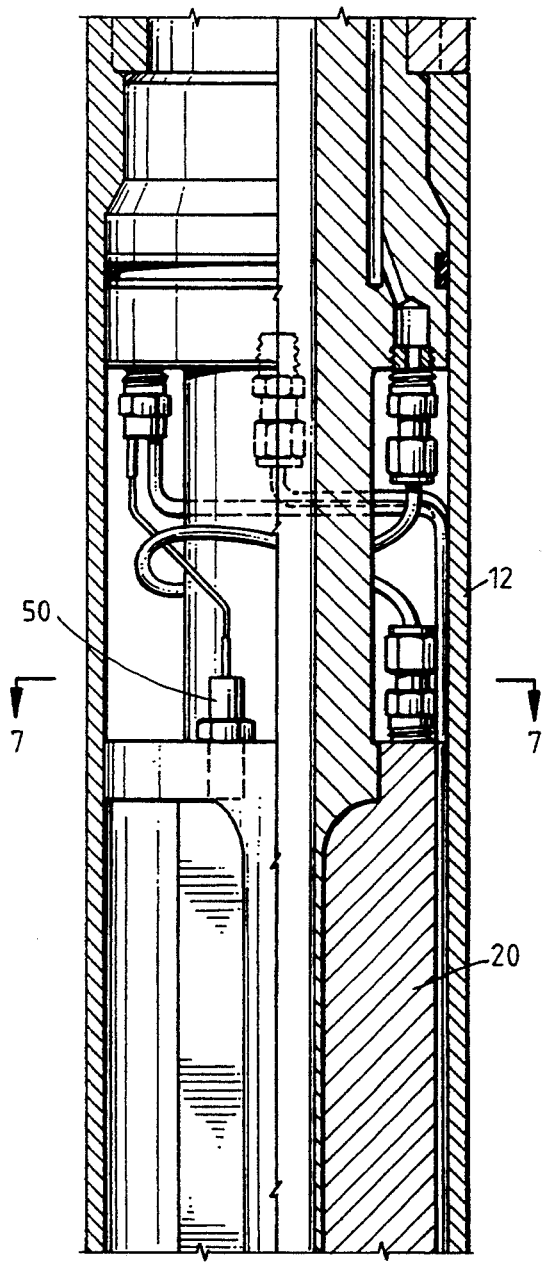

It is to be noted that certain features in the drawings are shown out of their true position for clarity.

While the rotary piston well tool of the present invention may be used to actuate various types of well tools, such as packers and sliding sleeves, the present invention will be described, for purposes of illustration only, as used in an orientation tool.

Referring now to the drawings, and particularly to FIGS. 1A–1E, the reference numeral 10 generally indicates an orientation tool using the rotary piston of the present invention. The orientation tool 10 is particularly useful for attachment to a coiled tubing (not shown) for actuating a well thruster, as described in copending patent application Ser. No. 07/963,864, filed Oct. 20, 1992, which is incorporated herein by reference, for drilling a deviated well bore.

The orientation tool 10 includes an elongate circular body 12 having an enclosed fluid bore 14 extending longitudinally through the body 12. The bore 14 is enclosed by the enclosure 16 and is useful for the passage of well fluids such as drilling fluids for example. The orientation tool 10 may also include a mandrel 18 rotatable in the body 12 and extending out of the bottom of the body 12 for providing rotation to a well tool such as a well thruster (not shown) for orienting a conventional bottom hole assembly which conventionally includes a bent sub, a fluid motor, and a drill bit.

Figure 7:
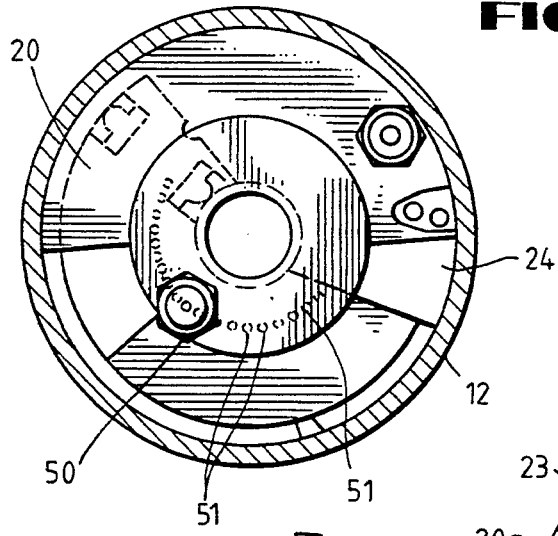
FIG. 7 is a cross-sectional view taken along the line 7—7 of FIG. 1C.
Figure 8:
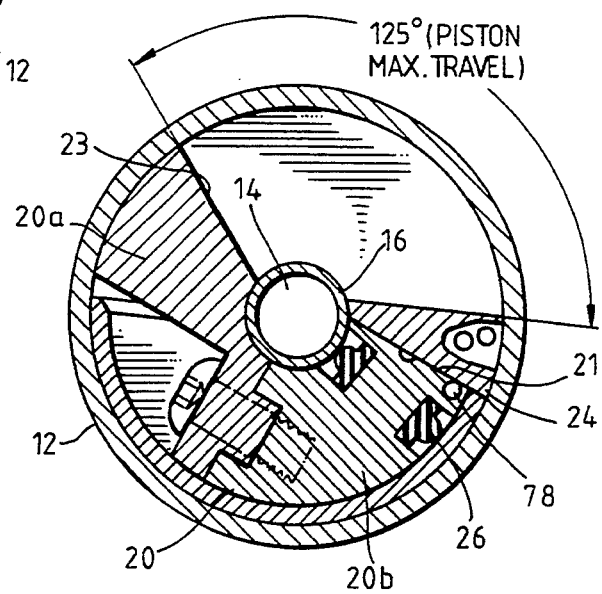
FIG. 8 is a cross-sectional view taken along the line 8—8 of FIG. 1D.
Figure 15:
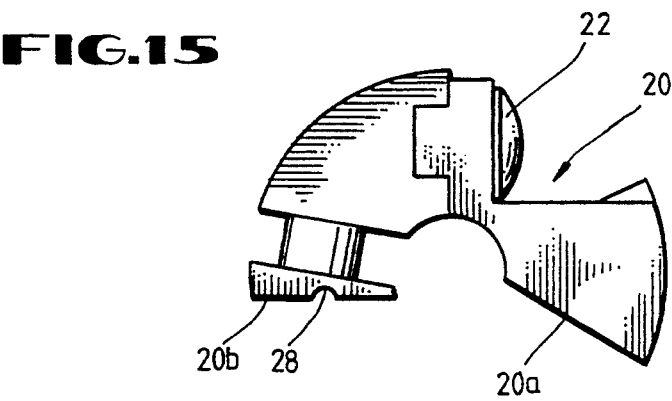
FIG. 15 is a top end view of the rotary piston of the present invention.
Figure 16:
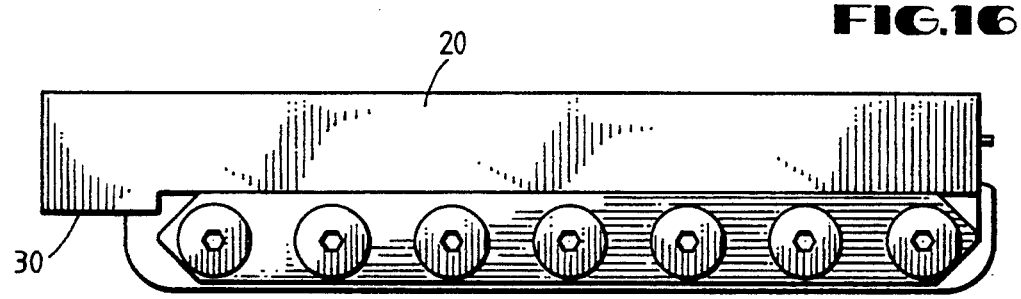
FIG. 16 is a side elevational view of the piston of FIG. 15.

Referring now to FIGS. 1C, 1D, 7, 8, 15 and 16, a rotatable hydraulic piston 20 is rotatably positioned in the body 12 between the fluid enclosure 16 and the interior of the body 12. As best seen in FIGS. 15 and 16, the annular piston preferably for reasons of installation, may consist of two parts 20a and 20b which are joined together by a plurality of fasteners such as bolts 22. A fixed plate or wall 24 extends radially between the enclosed bore 16 and the body 12. Piston seal means 26 provides a piston seal between the enclosure 16 and the body 12. As best seen in FIG. 8, the piston, as illustrated, has a maximum rotatable travel of 125°. The piston is rotated by the application of hydraulic pressure from a hydraulic control line 78, as will be more fully discussed hereinafter, extending to a position between the first side 21 of the piston 20 and the fixed plate 24. Preferably, the face of the first side 21 of the piston 20 includes a recess 28 for providing a space between the piston 20 and the fixed plate 24. The rotary piston of the present invention is useful for other types of well tools as it provides several advantages over longitudinally actuated well tool pistons. First, the effective piston area of a longitudinally movable piston is limited by the diameter of the body 12. However, the rotary piston 20 of the present invention can be made of any desirable longitudinal length and therefore of any desirable area for providing a greater output force with a set hydraulic pressure. Secondly, the friction of the rotary piston 20 is minimum as its friction is that of the seal 26 and therefore its output torque can be more accurately ascertained. Thirdly, the rotary piston 20, since it already provides rotary motion, does not require additional and friction producing components to change longitudinal motion to rotary motion as in other well tools. The particular rotary piston 20 as illustrated has an annular extent of approximately 180° thereby providing greater support. However, other annular dimensions may be used.

Figure 9:
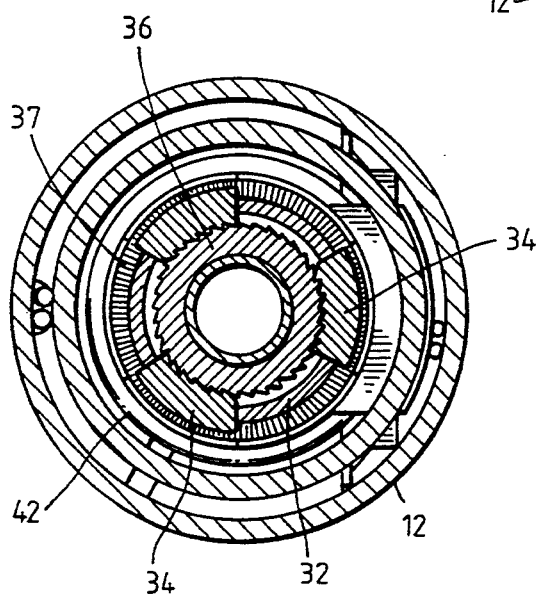
FIG. 9 is a cross-sectional view taken along the line 9—9 of FIG. 1D.

For converting the rotary movement of the piston 20 to a rotary drive for the mandrel 18, the piston 20 includes a tail connection 30 (FIGS. 1D and 16) for rotatively moving a cage 32 (FIGS. 1D and 9) which carry a plurality of ratchet keys 34 which are yieldably urged into engagement with a ratchet wheel 36 by springs 37. Therefore, rotation of the cage 32 in a clockwise direction, as best seen in FIG. 9, carries the ratchet keys 34 which rotates the ratchet wheel 36. The ratchet wheel 36 is connected to a second ratchet wheel 38 (FIGS. 1D and 10) which in turn is connected to the mandrel 18 by splines 40 and recesses 41.

Figure 10:
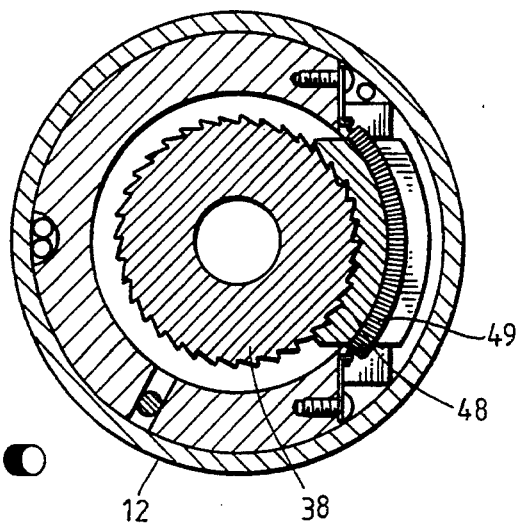
FIG. 10 is a cross-sectional view taken along the line 10—10 of FIG. 1D.
Figure 11:
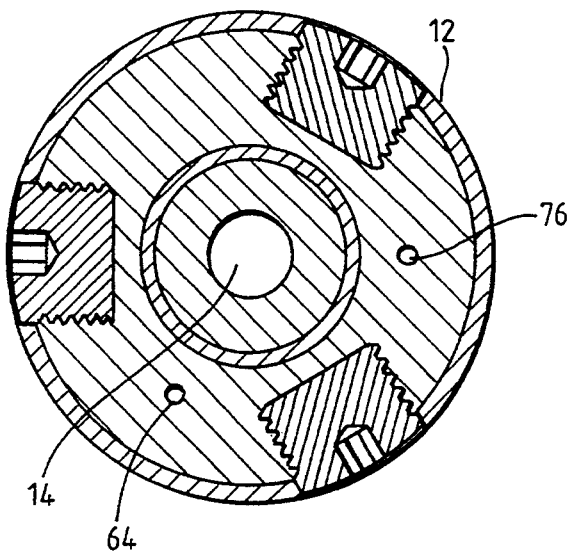
FIG. 11 is a cross-sectional view taken along the line 11—11 of FIG. 1E.
Figure 12:
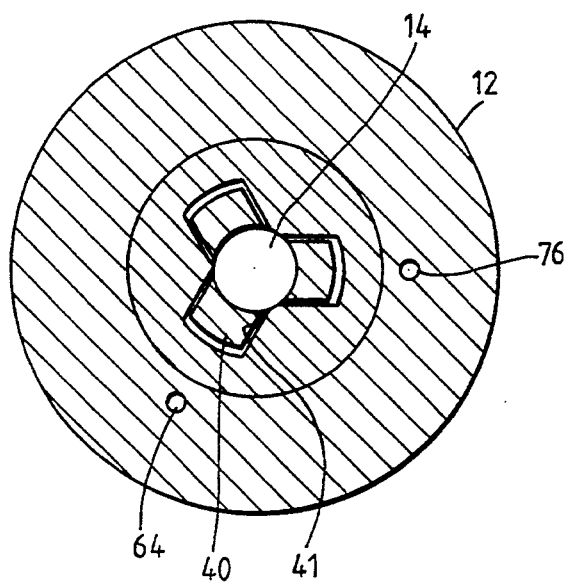
FIG. 12 is a cross-sectional view taken along the line 12—12 of FIG. 1E.

However, as previously indicated the rotary piston 20 of the present invention does not rotate a full 360°, and in the example given rotates only 125°. Therefore, as best seen in FIGS. 1D and 9, a torsion spring 42 is provided having one end connected to the body 12 and a second end 46 connected to the piston 20 for recocking the piston 20. That is, hydraulic fluid is applied to the piston 20 to provide rotation, as well as overcoming the spring 42, until the piston has been rotated to its full extent, here 125°. Hydraulic fluid is then cut off from the piston 20 and preferably vented as will be more fully discussed hereinafter, thereby allowing the spring 42 to be recocked for providing additional rotational movements. Also, any well fluids in the body 12 act against the second side 23 of the piston 20 assisting in resetting the piston 20. Rotation of the piston 20, cage 32 and ratchet keys 34 in a recocking mode allows the keys 34 to move in a counterclockwise direction as seen in FIG. 9 to ratchet around the first ratchet 36 without affecting the rotational position of the first ratchet 36 or the second ratchet 38. Preferably, the ratchet 38 is held in its forward or clockwise direction, as best seen in FIG. 10, by a block 48 urged into engagement with the ratchet 38 by spring 49. Thus, the piston 20 can be recocked each time it reaches the end of the extent of its rotational travel while the mandrel 18 is held in position anti awaiting additional rotational movement, if required, from the piston 20.

Figure 1D:
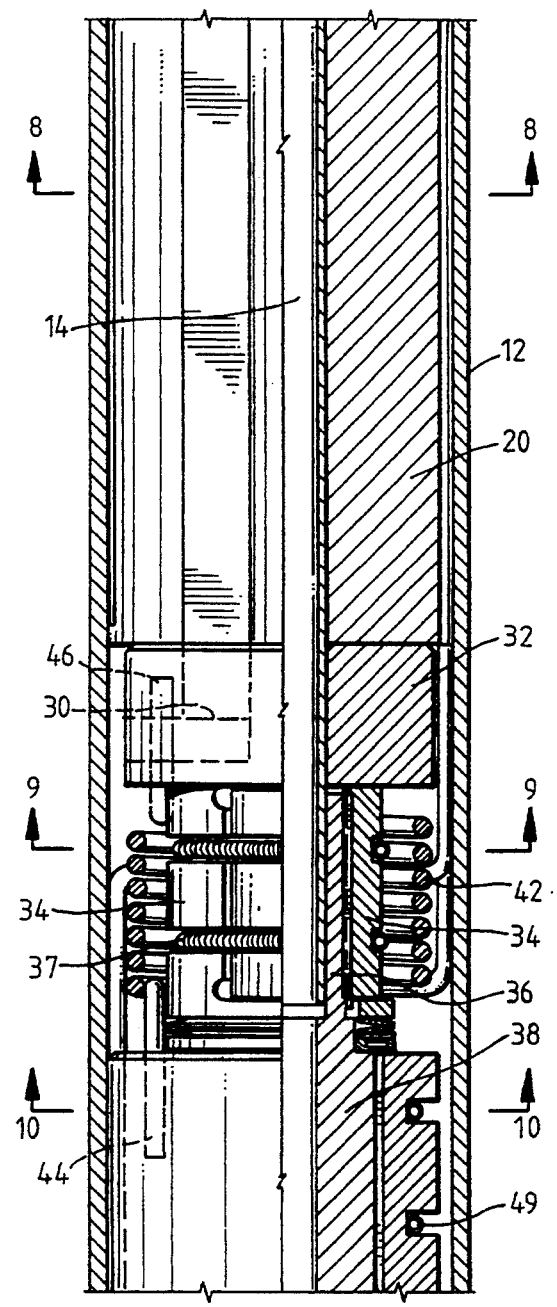

Referring now to FIGS. 1C and 7, the rotational position of the piston 20 may be ascertained by any suitable rotation measuring device such as a magnetic pickup 50 which senses magnetic segments 51 positioned on top of the piston 20.

Figure 5:
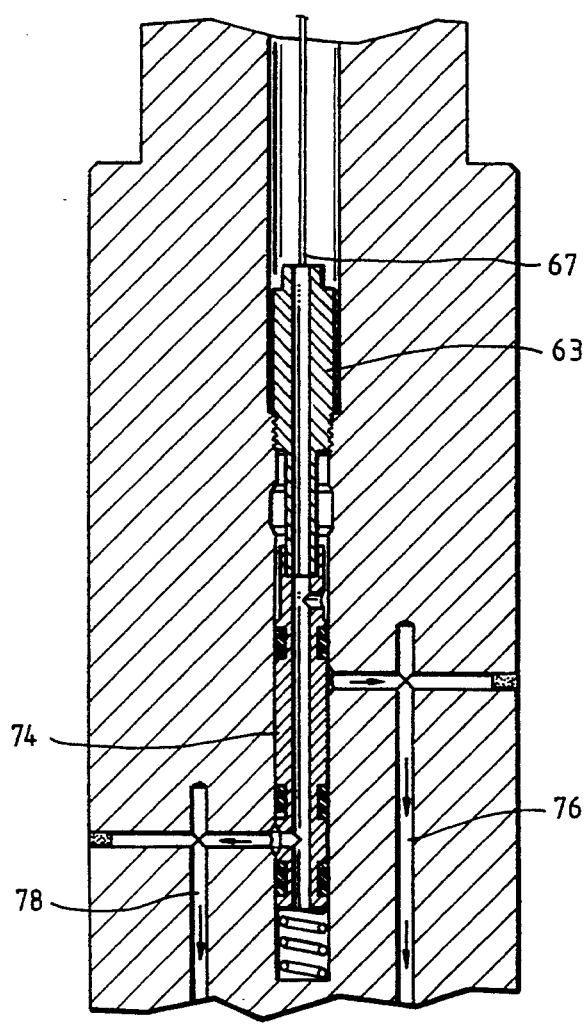
FIG. 5 is a view taken along the line 5—5 of FIG. 2.
Figure 4:
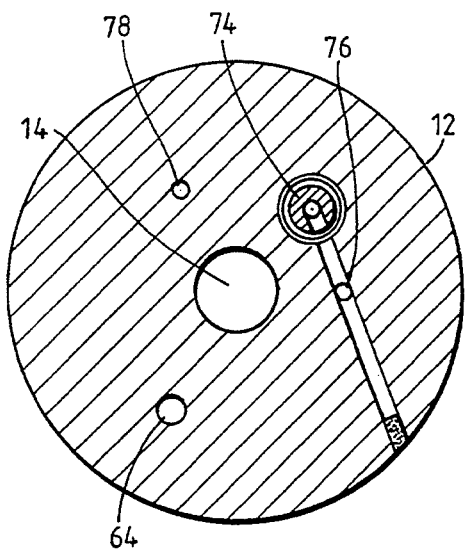
FIG. 4 is a cross-sectional view taken along the line 4—4 of FIG. 1B.
Figure 6:
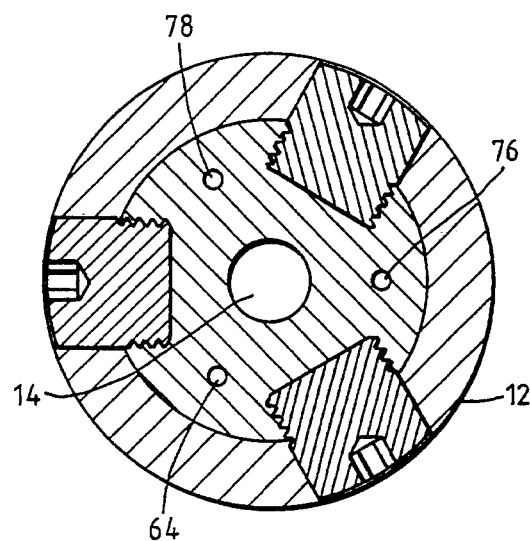
FIG. 6 is a cross-sectional view taken along the line 6—6 of FIG. 1B.

Referring now to FIG. 1A, the top of the orientation body 12 is best seen which may include a connection 56 for conventional attachment to the lower end of a conventional coil tubing. In addition, a hydraulic control line 60 and electrical cable 62 is supplied, such as through the interior of the coil tubing. The hydraulic control line 60 provides the hydraulic fluid for operating the orientation tool 10 and a well thruster (not shown). The electrical cable 62 includes one or more electrical lines, one of which, line 64, extends through the orientation tool 10 and through various downhole additional tools to provide information to the surface. Also, one of the electrical lines 66 may be connected to a load cell 68 to monitor buckling. Another of the electrical lines 67 is connected to and actuates an electrical motor 63 (FIG. 5). The hydraulic line 60 provides hydraulic fluid to a valve 74 to transmit the hydraulic fluid through a hydraulic line 76 to a well thruster or in the alternative to a hydraulic line 78 for supplying fluid to the annular hydraulic piston 20 in the orientation tool 10.

Figure 1E:
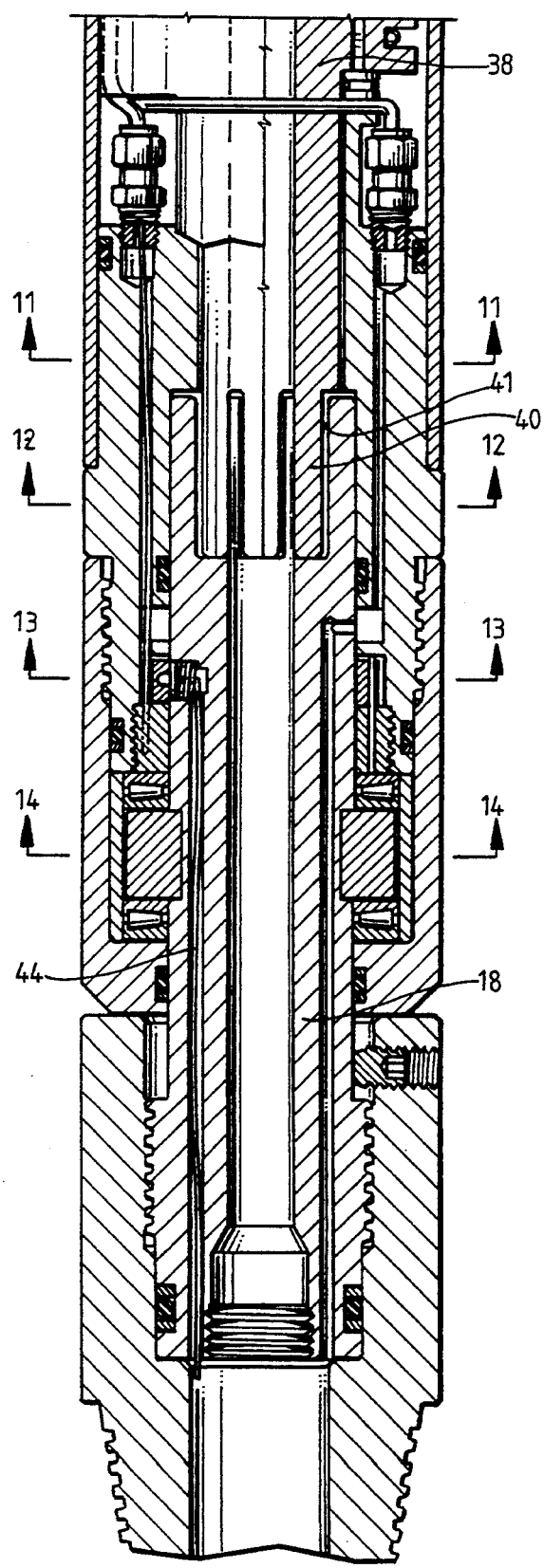
Figure 2:
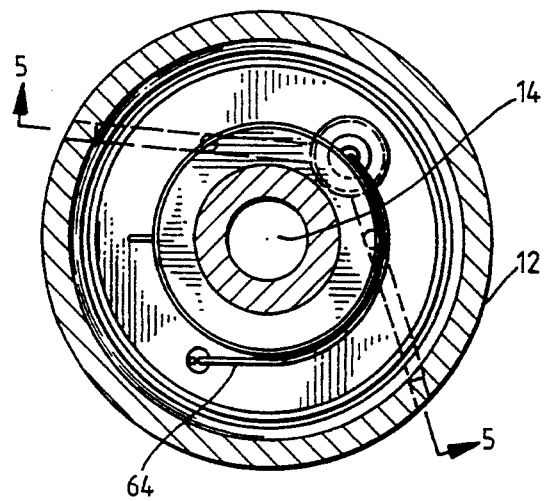
FIG. 2 is a cross-sectional view taken along the line 2—2 of FIG. 1A.
Figure 3:
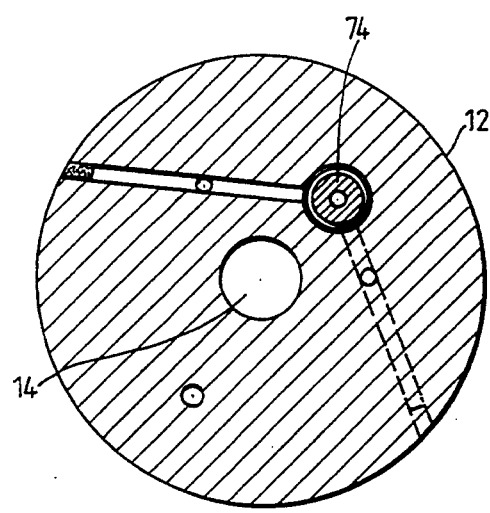
FIG. 3 is a cross-sectional view taken along the line 3—3 of FIG. 1B.
Figure 13:
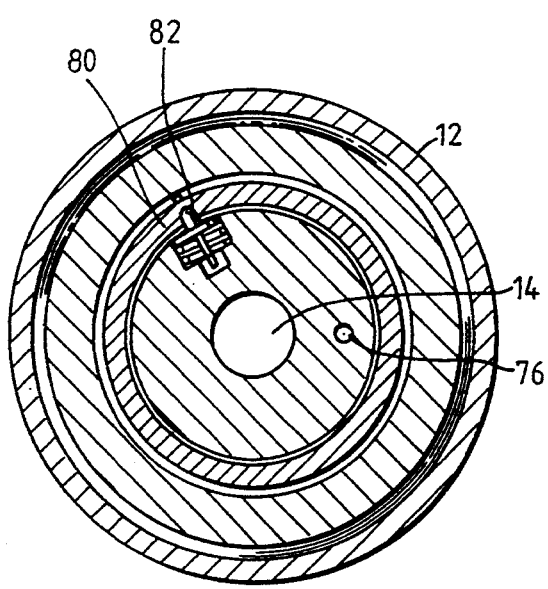
FIG. 13 is a cross-sectional view taken along the line 13—13 of FIG. 1E.
Figure 14:
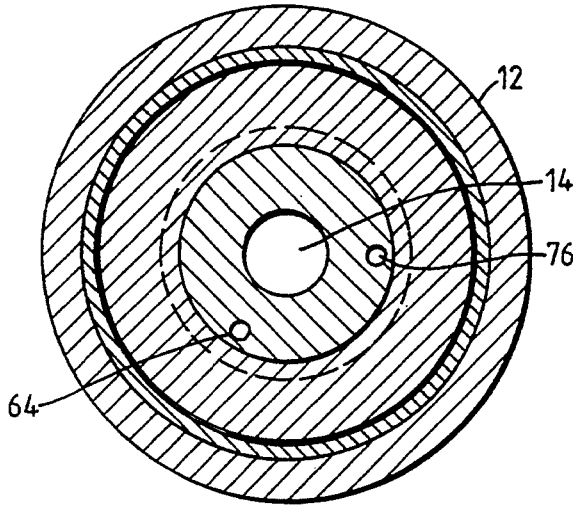
FIG. 14 is a cross-sectional view taken along the line 14—14 of FIG. 1E.

Referring to FIGS. 1E and 13, a rotating electrical contact in the electrical line 64 is shown which is provided as the orientation body 12 rotates. That is, the electrical line 66 includes a 360° ring 80 and a spring-loaded contact 82 bearing against the ring 80.

Figure 17:
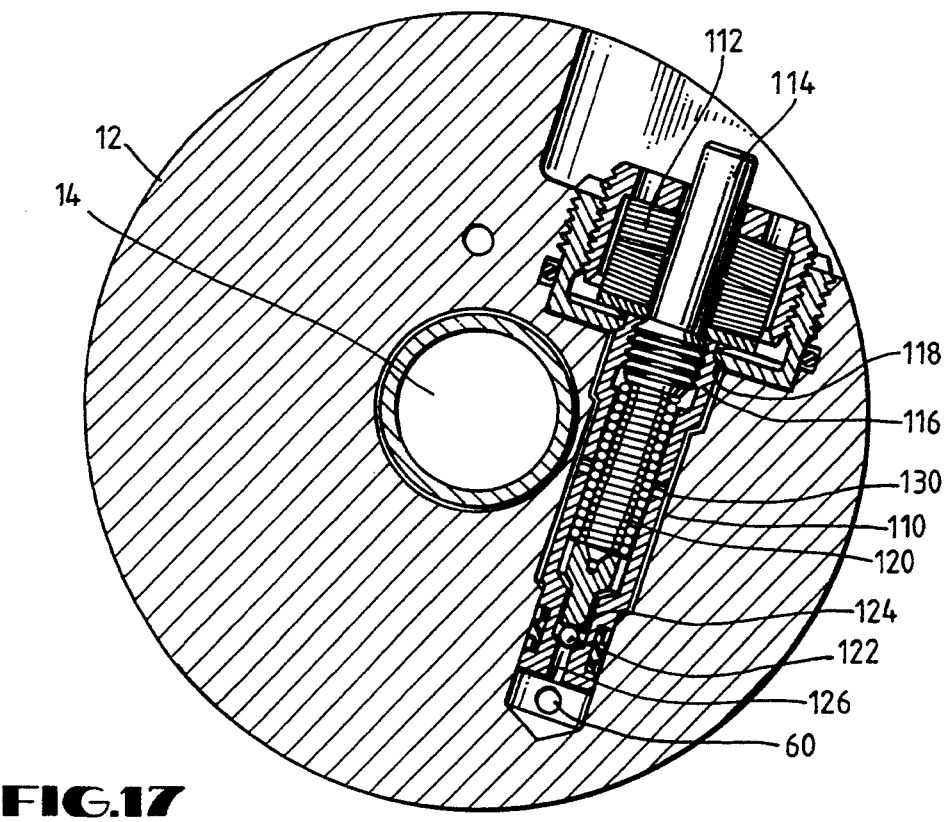
FIG. 17 is a cross-sectional view taken along the line 17—17 of FIG. 1B to denote an optional valve to be used in certain applications.

Referring now to FIG. 17, a valve 110 may be utilized at the line 17—17 of FIG. 1B for supplying or venting hydraulic fluid from the hydraulic line 60 which supplies hydraulic fluid through 78 which acts against a first side 21 of the piston 20. That is, if drilling fluid is being conducted down the bore 14 of the orienting tool 20 having a hydrostatic head higher than the hydrostatic head of the hydraulic control fluid in the line 78 the valve 110 can be omitted. That is, since the drilling fluid acts on a second side 23 of the piston 20 the piston 20 will be retracted when the pressure of the hydraulic fluid to the first side 21 of the piston 20 is decreased. However, in the event that the drilling fluid is air, the air will not have a sufficient hydrostatic head to return the rotary piston 20 to a starting position and overcome the hydrostatic head of the hydraulic control fluid in the lines 60 and 78 acting on the first side 21 of the piston 20. In such an event, the valve 110 is in communication with the hydraulic line 60 and includes a first spring 112 pushing a stem 114 downwardly to move a valve element 116 off of a valve seat 118. The valve 110 also includes a second spring 120 acting against a ball valve element 122 moving it onto a seat 124 to close a passageway 126. When a sufficient hydraulic control fluid is present in the line 60, the ball valve 122 moves off of the seat 124 and the valve element 116 moves against the seat 118 and hydraulic control fluid flows through a line 130 to the piston 20. However, when hydraulic fluid is shut off in the line 60, the springs 112 and 120 are strong enough to overcome the hydrostatic pressure in the line 60 and shut off the passageway 126 to the piston 20 and also vent the first side 21 of the piston 20 through the valve seat 118 to the outside of the body 12. Thus, venting of the hydraulic fluid in the control line from the piston 20 allows the resetting spring 42 to recock the piston 20 in spite of any hydrostatic head existing in the hydraulic control line.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made without departing from the spirit of the invention and the scope of the appended claims.

What is claimed is:

1. A rotary powered well tool comprising,
   an elongate circular body, said body having an inner enclosure extending longitudinally through the body,
   a fixed plate extending radially between the enclosure and the body,
   a rotatable piston horizontally aligned with the plate and extending between the enclosure and the body and rotatable about the enclosure, and
   a hydraulic control line longitudinally extending in the body and extending to a position between the plate and the piston for rotating the piston about the longitudinally extending enclosure.

2. The well tool of claim 1 including,
   means for recocking the piston.

3. The well tool of claim 2 wherein the recocking means includes spring means.

4. The well tool of claim 1 including,
   valve means in the hydraulic control line for admitting and venting fluid from the piston.

5. The well tool of claim 1 including,
   means for monitoring the rotational position of the piston.

6. A well orientation tool for rotational orientating a well tool in a well bore comprising,
   an elongate circular body, said body having an inner enclosure extending longitudinally through the body,
   a mandrel rotatable in the body and extending out of the body for providing rotation to a well tool,
   a fixed plate extending radially between the enclosure and the body,
   a rotatable piston extending between the enclosure and the body and rotatable about the enclosed bore, said piston connected to the mandrel whereby rotational movement of the piston rotates the mandrel, and
   a hydraulic control line longitudinally extending in the body and extending to a position between the plate and the piston.

7. The orientation tool of claim 6 including,
   means for recocking the piston.

8. The orientation tool of claim 7 wherein the recocking means includes a torsional spring.

9. The orientation tool of claim 6 including,
   valve means in the hydraulic control line for admitting and venting fluid from the piston.

10. The orientation tool of claim 6 including,
    means for monitoring the position of the piston.

11. The orientation tool of claim 7 including,
    first ratchet means for allowing recocking of the piston, and
    second ratchet means connected to the first ratchet means and to the mandrel for holding the rotational position of the mandrel.

* * * * *